June 2, 1964 S. G. FRANCISCO 3,135,954
ANALOG-TO-DIGITAL CONVERTER
Filed Nov. 26, 1958 3 Sheets-Sheet 1

INVENTOR.
SHERMAN G. FRANCISCO
BY Ralph R Barnard
ATTORNEY

June 2, 1964 S. G. FRANCISCO 3,135,954

ANALOG-TO-DIGITAL CONVERTER

Filed Nov. 26, 1958 3 Sheets-Sheet 2

June 2, 1964

S. G. FRANCISCO 3,135,954

ANALOG-TO-DIGITAL CONVERTER

Filed Nov. 26, 1958

3 Sheets-Sheet 3

United States Patent Office 3,135,954
Patented June 2, 1964

3,135,954
ANALOG-TO-DIGITAL CONVERTER

Sherman G. Francisco, Endicott, N.Y., assignor to International Business Machines Corporation, New York, N.Y., a corporation of New York Filed Nov. 26, 1958, Ser. No. 776,630
7 Claims. (Cl. 340—347)

Figure 1:
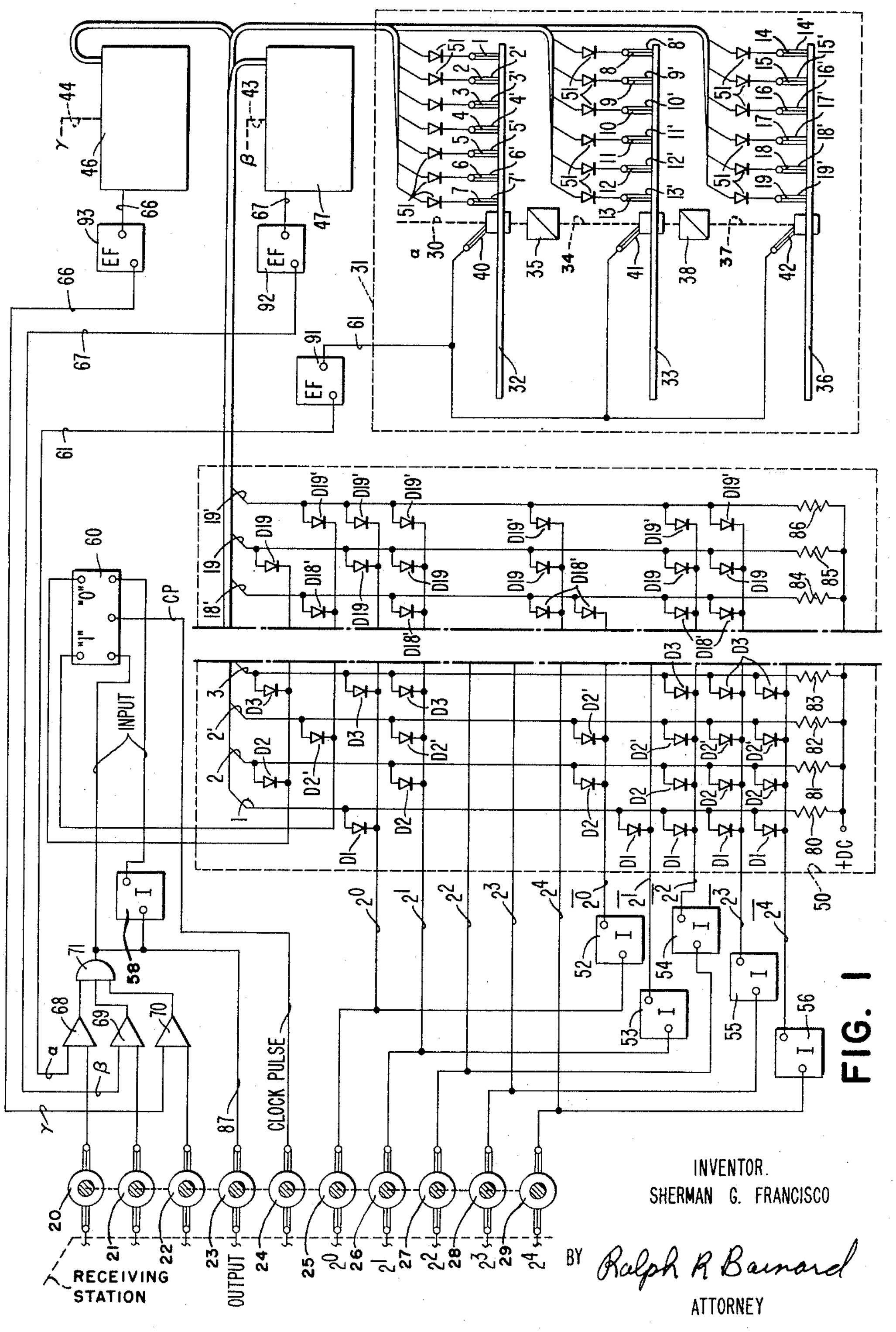

This invention relates generally to electrical telemetering apparatus and more particularly to a means for converting an analog shaft orientation to a digital electrical indication in a manner so that it may be transmitted to a remote station through a limited number of electrical conductors.

In electronic communications, computer, navigation and guidance equipment, it is often desired to convert an angular shaft position to a corresponding digital electrical indication and at the same time transmit this information to a remote receiving station where the digital information may be utilized. One of the design requirements for such a means often involves limiting the number of electrical conductors passing from the location of the angular shaft position to the remote receiving station. An example of such an instance is an inertial platform used in navigation systems for aircraft. This inertial platform is usually mounted on gimbals so that it has three angular degrees of freedom and may be continually corrected to maintain a stable reference with respect to inertial space. In order to make a practical electrical connection with a component mounted on the inertial platform, this connection must be of the slip ring type. Moreover, as a result of mechanical and electrical circuitry considerations, it is very desirable that the number of slip ring type connections required be kept to an absolute minimum.

One of the means used in the prior art for converting an analog shaft position to corresponding digital information is known as a shaft digitizer. The shaft digitizer, in a very commonly used form, may comprise a disc or plural discs, each having conductive and nonconductive coating segments on one surface forming concentric rings. Each of these rings corresponds to a particular order of binary digital information. For example, the first ring closest to the shaft may comprise one conductive segment and one nonconductive segment. The next ring may then comprise two conductive segments and two nonconductive segments, with the conductive and nonconductive segments arranged in alternative order. Likewise, each succeeding ring will have twice the number of conductive and nonconductive segments as the next preceding ring. The disc is then connected to be rotated by the shaft having the angular position which it is desired to convert to a binary-digital quantity. If more than one disc is used in order to obtain improved resolution, then each disc corresponding to the next higher order should be driven by the shaft driving the next lower order disc through reduction gearing having a ratio corresponding to a particular binary weighting.

All of the conductive segments of one disc are then electrically commoned to a source of potential applied to the hub of the disc. Plural brushes are provided to cooperate with the segments with at least one brush bearing on each ring. The presence or absence of an electrical voltage on each of the brushes is then indicative of a binary representation of the angular position of the shaft analog which it is desired to convert. Two brushes are often associated with each ring (except that corresponding to the lowest order digital information) in order that ambiguities do not arise, because the brushes are not perfectly aligned or are read during an interval of time when the shaft is moved slightly. This latter modification will be referred to hereinafter as the dual brush system.

Although this prior art technique results in the desired conversion of the angular position of a shaft to a digital information representation, heretofore it has been used in a manner so that it had the distinct disadvantage that each brush required a separate conductor in the transmission of the digital information to the relatively remote station. This is a very important disadvantage, because there are many practical applications, as exemplified by the gimbal mounted inertial platform referred to hereinabove, where it is desired to limit the number of slip rings required by each conductor passing through the gimbal system.

It should be understood that in order to obtain improved accuracy and resolution in a shaft digitizer type conversion, the number of rings of conductive and nonconductive segments is increased by increasing the diameter of one disc and/or utilizing plural discs being driven by the shaft having the analog angular position to be converted to electrical digital information. Using the prior art technique of energization and reading out a shaft digitizer, the number of conductors and corresponding slip rings would be increased as the number of brushes were increased in order to obtain a higher degree of accuracy and resolution in the analog-to-digital conversion. Furthermore, if a dual brush system such as that described in Patent 2,750,584, L. I. Goldfischer, inventor, is utilized, the number of conductors and slip rings required would be increased by a factor of 2.

As a result of the foregoing, whenever it is desired to transmit an analog angular position of a shaft from a location (exemplified by an inertial platform) to a relatively remote receiving station as electrical digital information through a limited number of electrical conductors and/or slip rings, the shaft digitizer (using the prior art technique of energization and reading out) has not been utilized with success. One alternative has been to use a multiple-speed synchro (resolver) repeater servo loop for each analog angular shaft position which it is desired to transmit as electrical digital information to a relatively remote station. For example, in applying a two-speed synchro repeater servo loop for transmitting an analog shaft position from an inertial platform, only two synchros and associated reduction gearing would have to be mounted on the platform with the number of conductors and slip rings utilized corresponding to the number of windings associated with the synchros or resolver. Notwithstanding the fact that the equipment and conductor requirement of this synchro technique would be determined by the number of analog shaft positions which it is desired to transmit to the relatively remote receiving station, the total number of conductors would be undoubtedly less than that required by the shaft digitizer technique described hereinabove based on a design performance providing equal degrees of accuracy and resolution. However, the two-speed synchro servo system does not provide the maximum degree of accuracy and resolution which may be obtained by the proper design and use of a multiple-disc shaft digitizer. Furthermore, after the two-speed synchro (or multiple-speed synchro) servo system has been utilized to transmit the analog shaft position to a relative remote receiving station as an electrical analog quantity, further conversion means, such as shaft digitizers, are required to accomplish the conversion to electrical digital information, thereby increasing the system complexity and cost.

It is, therefore, a primary object of the present invention to provide a new and improved means for converting a shaft quantity to electrical digital information in a manner so that the electrical digital information may be transmitted to a remote station through a limited number of electrical conductors.

It is another object of the present invention to provide new and improved means for transmitting shaft position information to a relatively remote receiving station as electrical digital information, which takes advantage of the high degree of accuracy and resolution and relative simplicity of a shaft digitizer utilizing plural discs, in a manner which requires only a limited number of conductors therebetween.

It is still another object of the present invention to provide new and improved means for transmitting shaft position information on a gimbal mounted platform to a relatively remote receiving station which takes advantage of the high degree of accuracy and resolution and relative simplicity of the shaft digitizer utilizing plural discs in a manner which requires only a limited number of conductors therebetween and a limited number of slip rings on the gimbal system.

Other objects of the invention will be pointed out in the following description and claims and illustrated in the accompanying drawings which disclosed, by way of examples, the principle of the invention and the best mode which has been contemplated of applying that principle.

Figure 2:
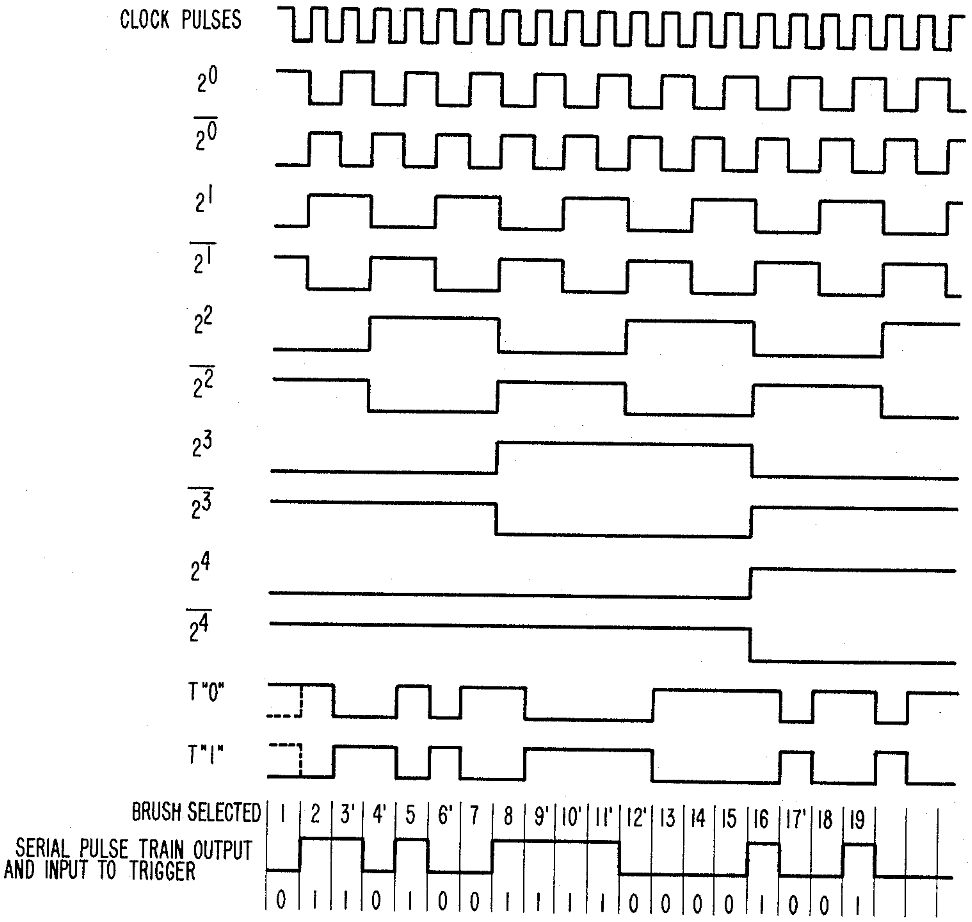
Figure 3:
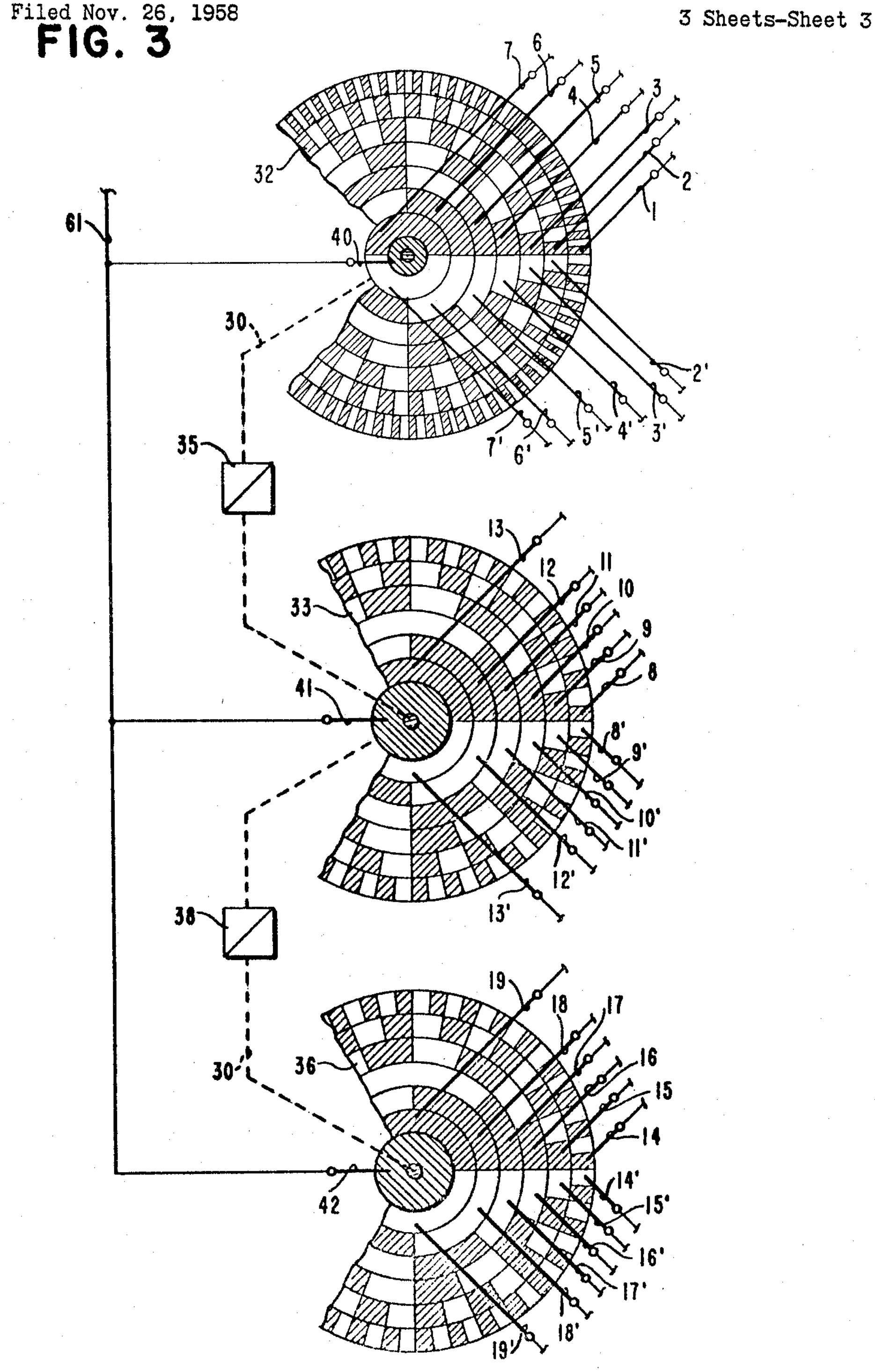

In the drawings:

FIG. 1 cooperatively shows the teachings of the present invention applied to transmitting and converting shaft information from an inertial platform through a remote station utilizing a minimum of slip rings;

FIG. 2 comprises a timing chart which will be helpful in understanding FIG. 1; and FIG. 3 shows a shaft digitizer constructed in accordance with the teachings of the prior art to illustrate another view of the shaft digitizer shown in block 31 of FIG. 1. Identical identification numerals are used to correspond to those shown in FIG. 1.

Briefly, the present invention comprises the utilization of a multi-disc shaft digitizer for each analog shaft position which it is desired to convert to electrical digital information for transmission to a relatively remote receiving station. According to the teachings of the present invention, the brushes of the shaft digitizers may be interrogated selectively rather than simultaneously, as done in the prior art. More particularly, binary coded interrogation pulses may be transmitted via plural channels through the gimbal system or its equivalent via slip rings to a conventional decoding matrix mounted on the platform for the purpose of successively energizing each brush of a shaft digitizer. Thus, if each disc is electrically monitored by a conductor at its hub, appropriate serial output pulses will be generated thereon which will correspond to the digital representation of the position of the shaft. This electrical conductor may then be passed from the platform through the gimbal system via a slip ring to the remote station for use as digital information. It should be noted that the plural outputs of one decoding matrix may be utilized to successively energize the brushes of several multi-disc shaft digitizers (positioned by corresponding analog shafts) in parallel. Accordingly, the present technique utilizes a limited number of conductors between the transmitting location and the remote receiving station while converting one or more analog shaft positions to digital electrical information and, at the same time, requires a minimum number of extra components such as the diode matrix on the platform for that purpose.

Referring to FIG. 1, three exemplary shafts 30, 43 and 44 are shown, each having an analog position $\alpha$, $\beta$ and $\gamma$, respectively, which it is desired to convert to electrical digital information for the purpose of transmitting this information to a relatively remote receiving station (not shown) through a mechanical configuration, such as a gimbal mounting for a platform, represented diagrammatically by slip rings 20 through 29. The analog shaft positions $\alpha$, $\beta$, and $\gamma$ may be generated on the platform. From a mechanical design viewpoint, the number of slip rings required to pass a conductor through the gimbal system would be determined by the degrees of freedom provided by the system and whether the range of each was greater than one revolution, or 360°. In FIG. 1, only one slip ring is shown for each conductor passing through the gimbal system.

Connected to each of the shafts 30, 43 and 44 is a shaft digitizer having the desired number of discs and brushes required to provide the desired amount of accuracy and resolution in the conversion. For example, shaft 30, having a position commensurate with analog shaft position $\alpha$, is connected to a multi-disc shaft digitizer 31 comprising a low order disc 32, a next higher order disc 33 driven by shaft 34 via reduction gearing 35 and shaft 30, and a next higher order disc 36 driven by shaft 37 via reduction gearing 38 and shaft 34. Assuming that it is desired that analog shaft position $\alpha$ be converted to binary digital information having an accuracy and resolution of $2^{19}$ through a 4096 turn range and further assuming that an exemplary multi-disc shaft digitizer construction, as generally described hereinabove, disc 32 may contain seven rings of conducting and nonconducting segments, disc 33 may be constructed to contain six concentric rings of conducting and nonconducting segments, and disc 36 may be constructed to contain 6 rings of conducting and nonconducting segments. It is emphasized that the number of discs and rings of conducting and nonconducting segments is a matter of choice depending upon the accuracy and resolution desired. Moreover, when it is desired to use the dual brush system, two brushes cooperate with each ring, except the one corresponding to the lowest order of binary digital information.

Accordingly, in FIG. 1 disc 32 has the brush 1 cooperating with its lowest order ring and dual brushes 2 and 2', 3 and 3', 4 and 4', 5 and 5', 6 and 6', and 7 and 7' cooperating with the next six concentric rings, each having an increased order of significance. Likewise, disc 33 has dual brushes 8 and 8', 9 and 9', 10 and 10', 11 and 11', 12 and 12', and 13 and 13' cooperating with the next six orders of binary digital information represented by the six rings contained therein. In order to simplify FIG. 1, the brushes designated by the prime numbers are identified by the lead lines as being behind the brushes identified without the prime numbers and therefore out of view. Of course, brush number 1 would not have a brush behind it and out of view. Finally, disc 36 has dual brushes 14 and 14', 15 and 15', 16 and 16', 17 and 17', 18 and 18', and 19 and 19' cooperating with the next six orders of binary digital information represented by the six rings contained therein. In a dual brush system, one brush is placed in a leading relationship, and the other brush is placed in the lagging relationship with respect to the position which could be utilized if only one brush per ring were selected. This technique is described in more detail in the above identified Goldfischer patent. The details thereof form no part of the present invention. Herein, brush 2 represents the leading brush, brush 2' represents the lagging brush, brush 3 represents the leading brush, brush 3' represents the lagging brush, etc. Each of the discs 32, 33 and 36 also has additional brushes 40, 41, 42, respectively, making electrical contact with the hub and the commoned conducting portions of each of the disc. FIG. 3 shows another view of shaft digitizer 31.

According to the prior art technique for utilizing analog-to-digital converter shaft digitizers, a voltage would be applied to the commoned conductor through the brushes 40, 41 and 42, and the brushes 1 through 19' would be interrogated substantially simultaneously to provide a parallel digital voltage output on plural conductors (one for each brush) commensurate with the analog shaft position. When the shaft digitizer is mounted in an environment such that slip rings have to be utilized for transmitting this information to a relatively remote receiving station, at least one slip ring is required for each conductor. As those skilled in the art know, this technique is undesirable both mechanically and electrically, because the number of slip rings probably could be prohibitive. For example, multi-disc shaft digitizer 31 utilizes a total of 37 brushes to obtain what many would consider a very modest resolution in obtaining an analog-to-digital conversion. Utilizing the teachings of the prior art, at least 37 slip rings would be required to transmit this information to a relatively remote station for each unlimited angular degree of freedom of the mounting through which it must pass. Furthermore, if the gimbal mounted platform contains additional shafts 43 and 44 commensurate with the analog shaft positions $\beta$ and $\gamma$, respectively, which also have to be converted to digital information for transmission to a relatively remote receiving station, shaft digitizers 46 and 47 (shown in block form) must each have an equivalent number of brushes, depending upon the resolution desired.

The technical problems arising from the use of the shaft digitizers, according to the prior art techniques, have heretofore prohibited the use of shaft digitizers on mechanical assemblies where slip rings had to be used. The teachings of the present invention provide a technique which allows electrical systems designers to reconsider these well established limitations on the use of shaft digitizers by recognizing that the use of a dual brush system, while providing accurate digital output information even though the shaft having an analog position to be converted is moving during the readout, also allows sufficient time so that the brushes may be selected successively rather than simultaneously. Specifically, according to the present invention, each of the rings corresponding to binary bits 1 through 19′ are successively interrogated by appropriately energizing either the leading or lagging brush for each increasing order of significance in accordance with the serial binary pulse train being derived in commoned conductor readout via the common conductive portion of each of discs 32, 33 and 36 and brushes 40, 41 and 42. This serial pulse train is commensurate with the binary digital representation of the analog shaft position $\alpha$.

Since each of the brushes 1 through 19′ are required to be selectively energized by an electrical voltage, an electrical translator may be used for that purpose. By way of example, a conventional diode matrix acting as a translator may be used for energizing one of a large number of conductors in accordance with a parallel binary coded interrogation pulse source input via plural conductors corresponding in number to the orders of significance of the parallel binary coded interrogation pulse source input. Since the relatively remote receiving station utilizes binary digital information read from the platform, it undoubtedly is a type of digital computer and may conventionally act as a source of parallel binary coded timing inputs over plural conductors.

Assuming such a conventional source of plural binary coded electrical waveforms, a voltage commensurate with $2^0$ may be passed to the platform via slip ring 25 and applied to the exemplary diode matrix 50 both directly and indirectly through inverter 52; a voltage waveform commensurate with $2^1$ may be passed to the platform via slip ring 26 and applied as an input to exemplary diode matrix 50 both directly and indirectly through inverter 53; a voltage waveform commensurate with $2^2$ may be passed to the platform via slip ring 27 and applied as an input to exemplary diode matrix 50 both directly and indirectly through inverter 54; a voltage waveform commensurate with $2^3$ may be passed to the platform via slip ring 28 and applied as an input to exemplary diode matrix 50 both directly and indirectly through inverter 55; a voltage waveform commensurate with $2^4$ may be passed to the platform via slip ring 29 and applied as an input to exemplary diode matrix 50 both directly and indirectly through inverter 56.

As is well known to those skilled in the art, when using conventional techniques in the utilization of brush-type shaft digitizers, the ambiguity problems of a shaft digitizer may be avoided by selectively reading the leading brush when the next lower order brush reads out a "0" and by selectively reading the lagging brush when the next lower order brush reads out a "1." By way of contrast, the technique of the present invention selects the leading brush for energization when the next lower order digit is "0" and selects the lagging brush for energization when the next lower order digit in "1." The trigger 60 of FIG. 1 is used to select either the leading brushes 2, 3, 4, etc. or the lagging brushes 2′, 3′, 4′, etc. in accordance with the binary condition of the readout from the next lower order brush. As shown in FIG. 1, trigger 60 has a 0 output terminal and a 1 output terminal providing inputs to exemplary diode matrix 50, so as to select either the leading or lagging brush.

Thus, diode matrix 50 receives six voltage inputs commensurate with $2^0$, $2^1$, $2^2$, $2^3$ and $2^4$ timing pulses and the 0 output terminal of trigger 60 and at the same time receives six voltage inputs commensurate with $(\overline{2^0})$, $(\overline{2^1})$, $(\overline{2^2})$, $(\overline{2^3})$ and $(\overline{2^4})$ and the 1 output terminal trigger 60. The waveforms for these interrogating voltages are shown in FIG. 2. Applying conventional diode matrix techniques, these inputs are sufficient for a 6 x 6 matrix, thereby providing means for successively selecting 1 through 64 output conductors by the application of a voltage pulse thereon. However, since exemplary shaft digitizer 31 has only thirty-seven brushes (1 through 19′), the matrix 50 need be instrumented to have only the actual capacity of selectively energizing thirty-seven conductors.

As will be recognized by those skilled in the art, the diode matrix 50 is constructed as plural AND circuits where the output of a separate AND circuit acts as a conductor for energizing one of the brushes 1 through 19′. Stated another way, functionally there are as many AND circuits as there are brushes to energize. Accordingly, plural diodes D1 cooperate with the +D.C. supply voltage through resistor 80 and the $2^0$, $(\overline{2^1})$, $(\overline{2^2})$, $(\overline{2^2})$ and $(\overline{2^4})$ voltage inputs having the waveforms of FIG. 2 to provide the AND circuit for appropriately energizing brush 1. Likewise, the diodes D2 cooperate with the +D.C. supply voltage through resistor 81 and the $2^1$, $(\overline{2^0})$, $(\overline{2^2})$, $(\overline{2^3})$ and $(\overline{2^4})$ voltage inputs and the 0 output terminal of trigger 60 having the waveforms of FIG. 2 to provide the AND circuit for appropriately energizing brush 2. Similarly, the diodes D2′ cooperate with the +D.C. supply voltage through resistor 82 and the $2^1$, $(\overline{2^0})$, $(\overline{2^2})$, $(\overline{2^3})$ and $(\overline{2^4})$ voltage inputs and the 1 output terminal of trigger 60 having the waveforms of FIG. 2 to provide the AND circuit for appropriately energizing brush 21. Next, diodes D3 cooperate with the +D.C. supply voltage through resistor 83 and the $2^0$, $(\overline{2^1})$, $(\overline{2^2})$, $(\overline{2^3})$ and $(\overline{2^4})$ voltage inputs and the 0 output terminal of trigger 60 having the waveforms of FIG. 2 to provide the AND circuit for appropriately energizing brush 3.

For purposes of circuit simplicity, the portions of the matrix for providing the selected pulse to brushes 3′ through 18′ are not shown. However, they would comprise an AND circuit arrangement following the same pattern as that just described. Moreover, diodes D18′ are responsive to the voltage inputs having the waveforms of FIG. 2 and the +D.C. supply voltage shown to provide AND circuit selecting means for providing a voltage pulse to brush 18′; diodes D19 are responsive to the voltage inputs having the waveforms of FIG. 2 and the +D.C. supply voltage shown to provide AND circuit selecting means for providing a voltage to brush 19; and diodes D19′ are responsive to the voltage inputs having the waveforms of FIG. 2 and the +D.C. supply voltage shown to provide AND circuit selecting means for providing a voltage to brush 19′. Because only thirty-seven brushes have to be successively energized, the diode matrix 50 need not be constructed to provide its maximum of 64 possible outputs. Moreover, as shown in FIG. 1, a diode 51 is placed in the electrical lead to each brush 1 through 19′ for the purpose of preventing circulating currents.

Consequently, as a result of the selective energization of brushes 1 through 19′, in accordance with the application of the parallel binary coded interrogating source (shown to the left of slip rings 25 through 29 of FIG. 1), and output voltages from trigger 60 to the plural AND circuits making up diode matrix 50, a serial pulse train is derived on the hub of discs 32, 33 and 36 of shaft digitizer 31. This serial pulse train is passed through brushes 40, 41 and 42 to conductor 61 and is commensurate with the digital conversion of analog shaft position $\alpha$.

Although the outputs of the AND circuits of diode matrix 50 are shown connected to brushes 1 through 19′ of brush shaft digitizer 31, they may each be electrically commoned to corresponding brushes in shaft digitizers 46 and 47. Each of these shaft digitizers in turn is available to derive an appropriate serial-by-bit pulse train in output conductors 66 and 67, respectively.

In order to select one of these shaft digitizers for providing the digital output to the relatively remote receiving station, a parameter selector may be utilized. In its simplest form, this parameter selector may comprise three AND circuits 68, 69 and 70, as shown. As those skilled in the art know, when all of the inputs of a conventional positive AND circuit are at an up voltage level, its output is at an up voltage level. AND circuit 68 receives one input from conductor 61 and another input from a parameter selection means located at the relatively remote receiving station via slip ring 20. AND circuit 69 receives one input from conductor 66 and another input from a parameter selection means located at the relatively remote receiving station via slip ring 21, AND circuit 70 receives one input from conductor 67 and another input from a parameter selection means located at the relatively remote receiving station via slip ring 22.

Since the parameter selection made at the relatively remote receiving station will be of the nature as to furnish an up voltage level input to only one of AND circuits 68, 69 and 70 at the same time, the serial-by-bit pulse train derived on either conductors 61, 67 or 66 may be passed through OR circuit 71 at any one time and onto the relatively remote receiving station via slip ring 23. At the same time, the output from OR circuit 71 is applied to the input of trigger 60 to aid in the selection of the leading and lagging brushes in the manner described hereinabove. By way of example, trigger 60 may be of the type, which in its reset condition will have an up voltage level at its 0 output terminal and a down voltage level at its 1 output terminal. Conversely, in its set condition, trigger 60 will have a down voltage level at its 0 output terminal and an up voltage level at its 1 output terminal. When trigger 60 is of the type with two input terminals, one terminal is connected to the other by an inverter 58, as shown. Furthermore, when trigger 60 is in its reset condition, it will not change from this condition until a positive clock pulse is applied to its timing terminal in coincidence with an up level being applied to its input terminal. Similarly, when trigger 60 is in its set condition, it will be driven to its reset condition on the occurrence of a clock pulse in the absence of an up level being applied to its input terminal.

This operation for trigger 60 provides the necessary time delay for sampling the previous bit of binary information read from one pair of brushes corresponding to one order of significance to control the selection of either the leading or lagging brush of the next pair corresponding to the next higher order of significance at the precise time desired. If this time delay were not present, the action of trigger 60 in changing state for the proper selection of the applied leading and lagging brushes would destroy the serial-by-bit binary pulse train being transmitted to the remote receiving station (not shown) via slip ring 23. Triggers which will perform in a manner described hereinabove are known in the art and may be exemplified by the trigger described in FIG. 10.32, page 345, of textbook entitled Transistor Circuit Engineering, by R. F. Shea, published by John Wiley & Sons, Inc., 1957, New York, New York (first edition).

In order to understand the operation of the digital conversion technique set forth in FIG. 1, a timing chart and waveform analysis has been included in FIG. 2.

Assuming that the parameter selector is initiated by an up voltage level being applied to AND circuit 68 via slip ring 20 so that the output pulse train from shaft digitizer 31 will pass via output conductor 61 through OR circuit 71 and, furthermore, that the digital readout of that digitizer is 0110100111100001001 going from the lowest order to the highest order binary bit, FIG. 2 depicts the voltage waveforms of the appropriately labeled inputs and outputs of FIG. 1. It should be noted that the pulse width of the $2^0$ waveform of FIG. 2 is equal to a bit time of the binary pulse train to be read out. Trigger 60 may be in either the set or reset state.

As shown during the first bit time, the binary coded interrogating voltage waveforms $2^0$, $(\overline{2^1})$, $(\overline{2^2})$, $(\overline{2^3})$ and $(\overline{2^4})$ being applied to the diode matrix 50 are arranged so that all of the inputs to the positive AND circuit comprising diodes D1 are at an up level so as to reversely bias the diodes and selectively energize the lowest order brush 1. Since the lowest order binary bit to be read out of shaft digitizer 31 is a "0," brush 1 will make contact with an insulated brush of disc 32, and the input of parameter selecting AND circuit 68 will remain at a low level. Accordingly, the output of AND circuit 68, the output of OR circuit 71, the output conductor 69 passing through slip ring 23 to the remote receiving station, and the input terminal of trigger 60 also remain at a low voltage level.

Meanwhile, trigger 60 remains in its reset condition so that its 0 output terminal acts to select leading brush 2 of the next order ring of disc 32 by reversely biasing one of the diodes D2 connected thereto. Thus, during the next bit time when the $(\overline{2^0})$, $(2^1)$, $(\overline{2^2})$, $(\overline{2^3})$ and $(\overline{2^4})$ voltage interrogating waveforms are at up voltage levels, the positive AND circuit comprising diodes D2 acts to energize leading brush 2. Since the second binary bit being read out from shaft digitizer 31 is a "1," brush 2 will be passing over a conducting segment on disc 32 and an up voltage level is applied via conductor 61 through parameter selecting AND circuit 68 and OR circuit 71 to the input terminal of trigger 60, and to the remote receiving station via slip ring 23.

Since the input terminal of trigger 60 is now at an up level, the next positive clock pulse being applied via slip ring 24 will cause it to be driven to its set condition with its 1 output terminal going to an up voltage level and its 0 output terminal going to a down voltage level. When the 1 output terminal of trigger 60 is at the up level, it acts to select lagging brush 3′ of the next order ring of disc 32 by reversely biasing one of the diodes D3′ (not shown) connected thereto. Thus, during the next bit time when the $2^0$, $2^1$, $(\overline{2^2})$, $(\overline{2^3})$ and $(\overline{2^4})$ interrogating voltage waveforms are at up voltage levels, the positive AND circuit comprising diodes D3′ (not shown) acts to energize lagging brush 3′. Since the third binary bit being read out from shaft digitizer 31 is a "1," brush 3′ will be passing over a conducting segment on disc 32, and an up voltage level is applied via conductor 61 through parameter selecting AND circuit 68 and OR circuit 71 to the input terminal of trigger 60, and to the remote receiving station via slip ring 23.

Because the input terminal of trigger 60 continues to be at an up voltage level, the next positive clock pulse being applied thereto via slip ring 24 will cause it to remain in its set condition with its 1 output terminal at an up voltage level and its 0 output terminal at a down voltage level. In a manner similar to that already described hereinabove, the lagging brush 4' will be selected and energized by the cooperative action of the trigger 60 and the interrogating voltage waveforms on the positive AND circuit (not shown) having its output connected thereto.

Since the fourth binary bit being read out from shaft digitizer 31 is a "0," brush 4' will be passing over an insulating brush of disc 32 and a down voltage level is applied via conductor 6' through parameter selecting AND circuit 68, OR circuit 71 to the input terminal of trigger 60 and the remote receiving station via slip ring 23. Since the input terminal of trigger 60 is modified to a down voltage level, the next positive clock pulse being applied thereto via slip ring 24 will cause the trigger to be driven to its reset condition with its 0 output terminal changing to an up voltage level and its 1 output terminal changing to a down voltage level. Accordingly, leading brush 5 will be selected and energized by the cooperative action of trigger 60 and the interrogating voltage waveforms on the positive AND circuit (not shown) having its output connected thereto.

Following this general pattern, brush 5 will read out a binary "1" by passing an up voltage level to the remote receiving station via slip ring 23 and at the same time select lagging brush 6' by the action of trigger 60. Brush 6' is then energized by the action of the interrogating voltage waveforms on the AND circuit (not shown) connected thereto, and a binary "0" is read out from the shaft digitizer by the passage of a down voltage level to the remote receiving station via slip ring 23 through AND circuit 68 and OR circuit 71. Likewise, the down voltage level being applied to trigger 60 at the time of a positive clock pulse will cause that trigger to be driven back to its reset condition. It should be noted that in the reset condition, trigger 60 selects a leading brush for energization and in the set condition it selects a lagging brush for energization.

Accordingly, during the seventh bit time, a "0" is passed to the remote receiving station via slip ring 23, and leading brush 8 is selected for energization. The energization of leading brush 8 passes a binary "1" to the remote receiving station via slip ring 23 and selects a lagging brush 9' for energization. The lagging brush 9' passes a binary "1" to the remote receiving station and selects lagging brush 10' for energization. Following this pattern of operation, an output pulse train is derived and passed to the remote receiving station in a manner which, according to the present invention, utilizes the fewest number of electrical connections between the transmitting station (all of the electrical circuitry to the right of slip rings shown in FIG. 1) and the remote receiving station (not shown). When the binary electrical information being read out from shaft digitizer 31 is a 0110100111100001001, the output pulse train will have a waveform like that shown in FIG. 2.

The use of a trigger 60, having the characteristics as described hereinabove so as to cooperate with the diode matrix 50 and select either the leading or lagging brush of the shaft digitizer 31 in accordance with whether the previous serial binary pulse was a "1" or a "0," has many advantages to the operability of the system described in FIG. 1. The use of trigger 60 in this manner is the subject matter of a separate application No. 776,628 entitled Analog-to-Digital Converter, Edward J. Zola, Jr., inventor, filed the same date as the present invention.

The emitter-followers 97, 92 and 93 shown connected in conductors 61, 67 and 66 are conventional and function to provide electrical impedance matching in a conventional manner.

While there have been shown and described and pointed out the fundamental novel features of the invention as applied to a preferred embodiment along with several specific modifications, it will be understood that many additional omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Analog-to-digital conversion means comprising a shaft representing an analog quantity to be converted, a shaft digitizer means constructed to accommodate plural orders of digital significance mounted thereon including an electrically common hub means and electrical brush means associated with each order of digital significance, a source of binary coded interrogating pulses, decoding means connected to receive said interrogating pulses for selectively energizing said brush means on said shaft digitizer, and digital monitoring means electrically connected to said hub means of said shaft digitizer means for receiving serial pulses from said hub means commensurate with the angular position of said shaft.

2. An analog-to-digital conversion and transmission means comprising a transmitting station; a shaft representing an analog quantity to be converted; a shaft digitizer means constructed to accommodate plural orders of digital significance mounted thereon including an electrically common hub means and electrical brush means associated with each order of digital significance; a source of digitally coded interrogating pulses; decoding means connected to receive said interrogating pulses for selectively energizing said brush means on said shaft digitizer means; digital monitoring means electrically connected to the hub means of said shaft digitizer means for receiving serial pulses from said hub means commensurate with the angular position of said shaft; said shaft, said shaft digitizer and said decoding means being located at said transmitting station with electrical connections made thereto.

3. The analog-to-digital conversion and transmission means as set forth in claim 2 wherein said electrical connections made to the transmitting station comprise slip ring connections.

4. An analog-to-digital conversion and transmission means comprising a platform mounted so that electrical connections pass through the mounting; plural shafts each representing an analog quantity to be converted located on said platform; a shaft digitizer means attached to each of said plural shafts, each shaft digitizer means including a conductively coded surface arranged in plural rings around a hub and brush means associated with each ring; a source of digitally coded interrogating pulses; decoding means electrically connected to receive said interrogating pulses for selectively energizing corresponding brush means on each of said shaft digitizer means; digital monitoring means electrically connected to said hub of each of said shaft digitizer means for serially receiving pulses commensurate with the angular position of each shaft; said digital monitoring means including parameter selector means for selecting which of said shaft digitizer means is monitored; said shaft digitizer means and said decoding means being located on said platform with electrical connections passing thereto.

5. The analog-to-digital conversion and transmission means, as set forth in claim 4, wherein said electrical connections made to said platform comprise slip rings.

6. An analog-to-digital conversion and transmission means comprising a transmitting station; a mechanical device having a position representing an analog quantity to be converted to electrical digital information; an electrical-mechanical position decoder mounted on said device, including a single electrical output terminal and plural electrical input terminal means for energizing said position decoder; a source of digitally coded interrogating electrical pulses; electrical translating means connected to receive said interrogating pulses for selectively energizing said plural input terminal means of said electrical-mechanical position decoder; digital monitoring means electrically connected to the output terminal of said electrical-mechanical position decoder for serially receiving pulses from said output terminal commensurate with the position of said mechanical device; said mechanical device, said electrical-mechanical position decoder and said translating means being located at said transmitting station with electrical connections made thereto.

7. Analog-to-digital conversion means comprising a mechanical device having a position representing an analog quantity to be converted, a digitizer means mounted thereon including a single electrical output terminal and plural electrical input brush means cooperating therewith for energizing said digitizer means, a source of coded interrogating pulses, decoding means connected to receive said interrogating pulses for selectively energizing said brush means on said digitizer means, and digital monitoring means electrically connected to said electrical output terminal of said digitizer means for serially receiving pulses commensurate with the mechanical position of said device.

References Cited in the file of this patent

UNITED STATES PATENTS

| | | |
|---|---|---|
| 2,590,110 | Lippel | Mar. 25, 1952 |
| 2,731,631 | Spaulding | Jan. 17, 1956 |
| 2,747,797 | Beaumont | May 29, 1956 |
| 2,750,584 | Goldfischer | June 12, 1956 |
| 2,758,788 | Yaeger | Aug. 14, 1956 |
| 2,793,807 | Yaeger | May 28, 1957 |
| 2,862,660 | Purcell | Dec. 2, 1958 |
| 2,866,184 | Gray | Dec. 23, 1958 |
| 2,943,311 | Hulst | June 28, 1960 |
| 2,962,705 | Relis et al. | Nov. 29, 1960 |
| 2,977,582 | Wolman | Mar. 28, 1961 |
| 3,003,142 | Wolinsky | Oct. 3, 1961 |
| 3,030,617 | Chase | Apr. 17, 1962 |